United States Patent Office 3,514,258
Patented May 26, 1970

3,514,258
METHOD FOR PREPARING CARBONYLS OF RUTHENIUM AND OSMIUM
Michael Ian Bruce and Francis Gordon A. Stone, Bristol, England, assignors to Alfa Inorganics, Inc., Beverly, Mass., a corporation of Massachusetts
No Drawing. Filed June 12, 1967, Ser. No. 645,465
Int. Cl. C01g *1/04, 55/00*
U.S. Cl. 23—203         12 Claims

ABSTRACT OF THE DISCLOSURE

Method of preparing carbonyls of the formula $$M_3(CO)_{12}$$

where M is ruthenium or osmium wherein a solution of a halide of ruthenium or osmium, such as the chloride, bromide or iodide, or a halide derivative of these metals such as ammonium hexabromoosmate, or the carbonyl halides, in methanol, ethanol, 1,2-dimethoxyethane, 2-methoxyethane or higher aliphatic alcohols, is heated in a confined zone with carbon monoxide under a pressure of about 4 to 25 atmospheres and in the presence of zinc until the salt has reacted substantially completely to form the desired carbonyl.

---

This invention relates to a method for preparing carbonyls of ruthenium and osmium containing the metal atoms bonded to each other and also to the carbonyl groups but containing no bridging carbonyl groups. These carbonyls may be represented by the formula $M_3(CO)_{12}$ where M is ruthenium or osmium. They are air stable and are soluble in organic solvents, such as benzene or acetone.

In accordance with the method of the invention, a solution of a halide of ruthenium or osmium, such as the chloride, bromide or iodide, or a halide derivative of these metals, such as ammonium hexabromoosmate, or the carbonyl halides, is heated in a confined reaction zone with carbon monoxide under a pressure of about 4 to 25 atmospheres and in the presence of zinc until the salt has reacted substantially completely with carbon monoxide to form the desired carbonyl. We have obtained particularly good results with ruthenium trichloride and ammonium hexabromoosmate.

The method can be conducted at a temperature between 25° C. and 100° C. Higher temperatures cause some decomposition particularly of the ruthenium compound and lower temperatures unduly prolong the reaction time. Pressures below 4 atmospheres result in incomplete reaction and pressures higher than 25 atmospheres offer no advantage. A convenient pressure is about 10 atmospheres. The reaction time is not truly independent, since low pressures and temperatures prolong the reaction time and with higher pressures and temperatures the reaction time is correspondingly diminished. Using a pressure of about 10 atmospheres the reaction time is between 30 to 60 hours. Agitation of the reaction mixture is not essential but may be achieved either by stirring the reaction mixture or rocking the reaction vessel.

As illustrative of solvents which may be used in the method we may mention organic solvents, such as methanol, ethanol, 1,2-dimethoxyethane, 2-methoxyethanol, and higher aliphatic alcohols. If the solvent used is a non-solvent for the produced carbonyl, such as methanol, the product is readily removed from the reaction mixture by filtration. If the solvent used is at least a partial solvent for the produced carbonyl and has a boiling point below the melting point of the produced carbonyl, the product may be recovered by evaporation of the solvent. Higher boiling solvents are not used unless it is desired to use the solution of the produced carbonyl. The produced carbonyl may be purified, if desired, by sublimation or crystallization.

The invention is illustrated further by the following example.

Ruthenium trichloride (20 grams) containing about 45 percent of ruthenium was dissolved in methanol (1000 ml.), and the dark brown solution was transferred to a glass liner constructed to fit a 2 liter stainless steel autoclave. The liner was then transferred to the stainless steel pressure vessel, equipped with heating means, temperature means, pressure means, stirring means and gas inlet and outlet ports.

A sheet of clean perforated zinc (4 by 8 inches) was placed in the solution and a pressure of carbon monoxide of 25 atmospheres was initially impressed on the vessel and the vessel was heated to 65° C. and the temperature maintained at that point for 30 hours. After 6 hours the pressure had fallen to 10 atmospheres and the vessel was repressurized to 25 atmospheres with carbon monoxide. After 30 hours, the vessel was allowed to cool to room temperature, the pressure released, and the liner and contents removed.

The pale yellow-orange supernatant solution was poured through a filter, and the residue in the liner was washed three times with methanol (50 ml.), allowed to settle briefly, and poured through the filter. In this way the majority of a dark brown powdery material was removed from the liner, leaving behind the unused zinc and orange crystalline ruthenium carbonyl. The carbonyl was recrystallized from benzene to give fine bright orange crystals (melting point 155° C.) in up to 75 percent yield.

The filtrates from four such preparations were evaporated to a dark colored oil, and this was diluted to 1000 ml. with methanol, and recarbonylated in the presence of zinc sheet as described above. In this way a further amount of ruthenium carbonyl can be obtained, which increases the total conversion of ruthenium trichloride to ruthenium carbonyl to 83 to 85 percent.

We claim:
1. In a method for preparing a carbonyl represented by the formula $M_3(CO)_{12}$ where M is a metal selected from the group consisting of ruthenium and osmium, the step which comprises heating a solution of a compound selected from the group consisting of halides of ruthenium, halides of osmium, carbonyl halides of ruthenium, carbonyl halides of osmium, and ammonium hexabromoosmate, in a confined reaction zone with carbon monoxide under a pressure of from about 4 to 25 atmospheres and in the presence of zinc until the selected compound has reacted substantially completely with carbon monoxide to form a carbonyl having said formula, said heating being at a temperature between about 25° C. and about 100° C.

2. In a method for preparing a carbonyl represented by the formula $M_3(CO)_{12}$ where M is a metal selected from the group consisting of ruthenium and osmium, the step which comprises heating a solution of a compound selected from the group consisting of halides of ruthenium, halides of osmium, carbonyl halides of ruthenium, carbonyl halides of osmium, and ammonium hexabromoosmate, in a confined reaction zone with carbon monoxide under a pressure of from about 4 to 25 atmospheres and in the presence of sheet zinc until the selected compound has reacted substantially completely with carbon monoxide to form a carbonyl having said formula, said heating being at a temperature between about 25° C. and about 100° C.

3. The method as claimed by claim 2 wherein the solvent in said solution is a non-solvent for the produced carbonyl.

4. The method as claimed by claim 2 wherein said compound is a halide of ruthenium.

5. The method as claimed by claim 2 wherein said compound is a carbonyl halide of ruthenium.

6. The method as claimed by claim 2 wherein said compound is a halide of osmium.

7. The method as claimed by claim 2 wherein said compound is a carbonyl halide of osmium.

8. The method as claimed by claim 2 wherein said solvent is methanol.

9. The method as claimed by claim 2 wherein said compound is ruthenium trichloride.

10. The method as claimed by claim 2 wherein said compound is ammonium hexabromoosmate.

11. The method as claimed by claim 3 wherein the carbonyl having said formula is separated from the reaction mixture by filtration.

12. The method as claimed by claim 8 wherein said compound is ruthenium trichloride.

References Cited

UNITED STATES PATENTS 3,387,932   6/1968   Pino et al. _____ 23—203

EARL C. THOMAS, Primary Examiner